(12) United States Patent
Song et al.

(10) Patent No.: US 7,247,375 B2
(45) Date of Patent: *Jul. 24, 2007

(54) POLYMERIC MATRICES FOR THE ENCAPSULATION OF PHOSPHORESCENT MOLECULES FOR ANALYTICAL APPLICATIONS

(75) Inventors: Xuedong Song, Roswell, GA (US); Bin Wu, Sharon, MA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,093

(22) Filed: Apr. 30, 2004

(65) Prior Publication Data

US 2005/0244643 A1    Nov. 3, 2005

(51) Int. Cl.
B32B 5/16    (2006.01)

(52) U.S. Cl. .................. 428/403; 428/407; 428/328

(58) Field of Classification Search .............. 428/403, 428/407, 328

See application file for complete search history.

(56) References Cited

U.S. PATENT DOCUMENTS

| | | | |
|---|---|---|---|
| 2,650,169 A | 8/1953 | Goldstein | |
| 3,687,863 A | 8/1972 | Wacher | |
| 4,452,861 A | 6/1984 | Okamoto et al. | |
| 4,640,797 A | 2/1987 | Goguen | |
| 4,781,647 A | 11/1988 | Doane, Jr. | |
| 5,152,287 A | 10/1992 | Kane | |
| 5,464,741 A | 11/1995 | Hendrix | |
| 5,589,194 A | 12/1996 | Tsuei et al. | |
| 5,698,301 A * | 12/1997 | Yonetani | 428/213 |
| 5,786,219 A | 7/1998 | Zhang et al. | |
| 5,922,537 A | 7/1999 | Ewart et al. | |
| 5,977,241 A | 11/1999 | Koloski et al. | |
| 6,004,530 A | 12/1999 | Sagner et al. | |
| 6,232,386 B1 | 5/2001 | Vargo et al. | |
| 6,375,864 B1 | 4/2002 | Phillips et al. | |
| 6,562,460 B1 | 5/2003 | Bayless | |
| 6,582,930 B1 | 6/2003 | Ponomarev et al. | |
| 6,608,129 B1 | 8/2003 | Koloski et al. | |
| 6,653,654 B1 | 11/2003 | Che | |
| 6,770,220 B1 | 8/2004 | Klimant | |
| 2003/0087094 A1 | 5/2003 | Smith et al. | |
| 2003/0108911 A1 | 6/2003 | Klimant et al. | |
| 2005/0142371 A1 * | 6/2005 | Swain et al. | 428/516 |
| 2005/0285082 A1 | 12/2005 | Huang et al. | |

FOREIGN PATENT DOCUMENTS

WO    WO-PCT 0142385    6/2001
WO    WO-PCT 04016418    2/2004

OTHER PUBLICATIONS

O'Riordan, T.C. et al., "Performance Evaluation of the Phosphorescent Porphyrin Label; Solid-Phase Immunoassay of a-Fetoprotein", *Analytical Chemistry*, vol. 74, No. 22, Nov. 15, 2002, pp. 5845-5850.

Roza-Fernández, M. et al., "Room-Temperature Phosphorescent Palladium-Porphine Probe for DNA Determination", *Analytical Chemistry*, vol. 69, No. 13, Jul. 1, 1997, pp. 2406-2410.

Patent Abstracts of Japan, Publication No. JP 03134598, Jun. 7, 1991.

Kuriki, K. et al., "Plastic Optical Fiber Lasers and Amplifiers Containing Lanthanide Complexes," *Chemical Reviews*, vol. 102, No. 6, 2002, pp. 2347-2356.

Slooff, L.H. et al., "Optical properties of lissamine functionalized $Nd^{3+}$ complexes in polymer waveguides and solution," *Optical Materials*, vol. 14, 2000, pp. 101-107.

* cited by examiner

*Primary Examiner*—Leszek Kiliman
(74) *Attorney, Agent, or Firm*—Dority & Manning, P.A.

(57) ABSTRACT

The invention involves encapsulation of phosphorescent molecules in polymeric matrices to prevent phosphorescence quenching. Specifically, polymers containing a significant portion of halogens have been found to be good matrices for encapsulation of phosphorescent molecules to provide strong phosphorescence at ambient conditions. Those encapsulated phosphorescent molecules can find a wide variety of applications for detection of many species, including biological and chemical molecules as well as micro-organisms.

17 Claims, 3 Drawing Sheets

POLYMERIC MATRICES FOR THE ENCAPSULATION OF PHOSPHORESCENT MOLECULES FOR ANALYTICAL APPLICATIONS

BACKGROUND OF THE INVENTION

Phosphorescence is the result of a three-stage process. In the first stage, energy is supplied by an external source, such as an incandescent lamp or a laser, and absorbed by the phosphorescent compound, creating excited electronic triplet states (as opposed to fluorescence, which only has a singlet excited state). In the second stage, the excited states exist for a finite time during which the phosphorescent compound undergoes conformational changes and is also subject to a multitude of possible interactions with its molecular environment. During this time, the energy of the excited states is partially dissipated, yielding relaxed states from which phosphorescence emission originates. The third stage is the phosphorescence emission stage in which energy is emitted, returning the phosphorescence compound to its ground states. The emitted energy is lower than its excitation energy (light or laser) and thus of a longer wavelength. This shift or difference in energy or wavelength allows the emission energy to be detected and isolated from the excitation energy.

Quenching of phosphorescence is a phenomenon in which various reactants will bond with the triplet states and decrease the effective amount of phosphorescent compound available for use, thus interrupting the phosphorescent signal. Oxygen and water are strong quenchers of triplet states and may cause decay of the phosphorescence signal, thereby limiting its use in applications such as, for example, most practical biological assay applications. In order to obtain strong phosphorescence, oxygen often must be removed during the phosphorescence measurement.

Several phosphorescence molecules have nonetheless been documented for application in biological assays, including metallo-porphyrins. The phosphorescence molecules for biological assays are usually water soluble and have functional groups for easy covalent conjugation with biological molecules such as proteins. During use of these compounds, oxygen can be removed by various means, including using $Na_2SO_4$ in an aqueous solution. Unfortunately, these means are often cumbersome to use and generate problems in obtaining consistent results.

One way to avoid oxygen quenching of the phosphorescence is to encapsulate phosphorescent molecules inside a solid matrix to shield them from quenchers such as oxygen and water molecules. Selection of the encapsulation matrix is important. The matrix should have relatively low oxygen permeability and have relatively high solubility of the phosphorescent molecules so that high loading of the phosphorescent molecules can be achieved and strong phosphorescence can be obtained. For many applications, mono-dispersed phosphorescent particles of different sizes are desired. In those cases, the matrices should be capable of forming mono-dispersed particles. For other applications, the phosphorescent particles may also be desired to have various surface functional groups to allow further surface modifications.

Different types of matrices have been used for encapsulation of phosphorescent molecules to form phosphorescent particles. These matrices include inorganic materials and polymers. Of the polymers used for encapsulation of phosphorescent molecules to form particles, polystyrene (PS) and polyacrylonitrile (PAN) and their derivatives have been commercially used. These polymeric systems, however, do not allow for maximal phosphorescence intensity at ambient conditions. The polystyrene matrix is not ideal for encapsulation of phosphorescent molecules because of the poor solubility of many phosphorescent molecules (sometimes referred to as "phosphorescent dye" or "dye") in polystyrene, which results in low dye loading and relatively low phosphorescence. The oxygen solubility of polystyrene is also believed to be relatively high. PAN and its derivatives have been found to have low oxygen permeability but they have limited solubility for many phosphorescent molecules as well, which also limits their application for encapsulation of those phosphorescent molecules. There is a need for new matrix systems for the encapsulation of phosphorescent molecules to provide even higher phosphorescence intensity than that provided by PAN and its derivatives.

SUMMARY OF THE INVENTION

The invention described here addresses many of the issues encountered in current encapsulating polymeric systems for phosphorescent molecules. The invention uses halogen-containing polymers and co-polymers (HCPs) as an encapsulation matrix for organic and organometallic phosphorescent compounds to form micro- or nano-particles. The invention also concerns the production of surface-functionalized phosphorescent micro- and nano-particles and applications of those particles.

According to the invention, the phosphorescence of these encapsulated phosphorescent particles is substantially unaffected by phosphorescence quenchers such as oxygen and water molecules at ambient conditions. The particles provided by this invention can have a particularly high loading of phosphorescent molecules to provide strong phosphorescence and high photo stability. The invention also provides methods and processes to produce phosphorescent particles with surface functional groups. The sizes of the particles can be readily adjusted in the practice of the invention.

The invention also provides methods of functionalizing the particle surfaces with biological molecules. Those phosphorescent micro/nano-particles can find a wide variety of applications such as the detection of biological molecules and species in biological assays.

DETAILED DESCRIPTION OF THE INVENTION

Figure 1:
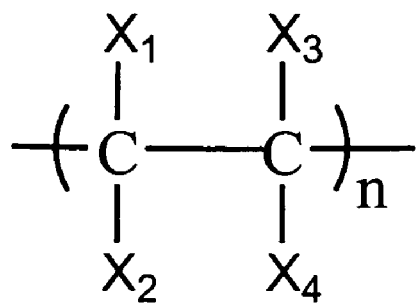
FIG. 1 is a diagram of a halogen-containing polymer.

The present invention relates to encapsulation of phosphorescent molecules by halogen-containing polymers and co-polymers (HCPs) to produce phosphorescent micro- and nanoparticles, where the phosphorescence can be detected by an unaided human eye under normal indoor lighting conditions. The invention also involves applications for the phosphorescent particles, particularly for biological applications such as detection of biological molecules and species.

"Encapsulation" as used herein includes a solution of a solid solute (such as a solid phosphorescent material) in a solid solvent (such as a polymer matrix). Such encapsulation may be generated by creating a liquid solution containing a liquid phosphorescent material and a liquid polymer and then co-precipitating the phosphorescent material and the polymer so that the solid phosphorescent material would be dispersed inside a matrix of the solid polymer material. The particles thus precipitated may be viewed as a solid solution of a phosphorescent material dissolved (or dispersed) in a solid polymer matrix solvent.

The term "halogen" herein refers to the elements of Group VII A of the Periodic Table and includes fluorine, chlorine, bromine and iodine. For purposes of the present invention, the term "halogen" also refers to molecules containing fluoride, chloride, bromide and iodide atoms and may include, but is not limited to, halogenated compounds such as halocarbons.

The term "halogen-containing polymer" and "halogen-containing co-polymer" (also called "HCPs") refers to a macromolecule formed by the chemical union of monomers at least a portion of which are halogen containing monomers. Exemplary HCPs include, but are not limited to, halogen-containing polyvinyl compounds, halogen-containing polyvinylidene compounds and various blends, mixtures and combinations thereof.

The methods and processes in the invention to produce the phosphorescent particles include the steps of: (1) dissolving halogen-containing polymers or co-polymers (HCPs) and phosphorescent molecules in a dissolving solvent with optional heating to make a first mixture; (2) mixing the first mixture with a precipitating solvent in which both the polymers and phosphorescent molecules have poor solubility to make a second mixture; (3) washing the formed particles; and (4) drying the particles or suspending the particles in storage solvents.

HCPs such as polyvinyl fluoride (PVF) and polyvinyl chloride (PVC) have been found to provide high loading of many phosphorescent molecules, such as metal chelates with organic ligands, which often have poor solubility in most organic solvents and solid matrices. HCPs, just like carbon halide solvents such as chloroform and methylene chloride, have very good compatibility with many organic compounds, including metal chelates with organic ligands. Although the present invention should not be held to any particular theory of operation, it is believed that the use of HCPs as encapsulation matrices can increase loading, reduce molecular aggregation and increase the homogeneous distribution of the encapsulated molecules in the matrices, features which are extremely beneficial when phosphorescent particles of high phosphorescence intensity are desired. In contrast, the use of a matrix with poor compatibility and solubility with the encapsulated phosphorescent molecules most likely will result in the molecular aggregation, low phosphorescence intensity and possible distortion of their spectral properties.

The HCPs can have a general structure as shown in FIG. 1, in which the halogen content is desirably between 5 and 90 weight percent; more desirably between 30 and 70 weight percent. In the structure of FIG. 1, at least one of X1-X4 contains one or more halogen atoms. The others among X1-X4 can be other atoms or groups, such as hydrogen atoms and methyl groups. Some specific examples of HCPs include, but are not limited to, polyvinyl fluoride (PVF), polyvinyl chloride (PVC), polyvinyl bromide (PVB), polyvinyl iodide (PVI), polyvinylidene fluoride, polyvinylidene chloride, polyvinylidene bromide, polyvinylidene iodide, and their derivatives.

Figure 2:
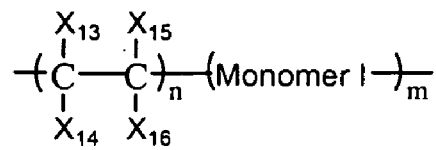
FIG. 2 is a diagram of a halogen-containing co-polymer.

The halogen-containing co-polymers can have a general structure as shown in FIG. 2, in which the halogen content of the polymer is between 5 and 90 weight percent, more desirably between 30 and 70 weight percent. At least one of X13-X16 contain one or more halogen atoms and monomer I represents, for example, ethylene, propylene, or other chemical moieties.

Figure 3:
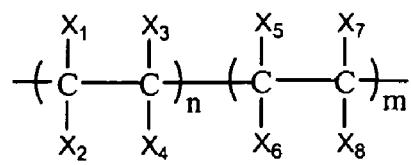
FIG. 3 is a diagram of a halogen-containing co-polymer.

Co-polymers with a general structure of FIG. 3 are more desirable, in which at least one of X1-X4 contains one or more halogen atoms. The others among X1-X4 can be other atoms or groups, such as hydrogen atoms and methyl groups. In the structure of FIG. 3, at least one of X5-X8 is a hydrophilic group. Examples of hydrophilic groups include, but are not limited to, carboxylic acid group, ethanolamine groups, hydroxyl groups, amine and amino groups, imine group and polyethylene glycol groups. Specific examples of the halogen-containing co-polymers include, but are not limited to, co-polymers of vinyl fluoride, vinyl chloride, vinyl bromide and vinyl iodide with other monomers such as acrylic acid and methacrylic acid. The halogen-containing monomer is desirably a significant portion (greater than 50 weight percent) of the co-polymers.

Figure 4:
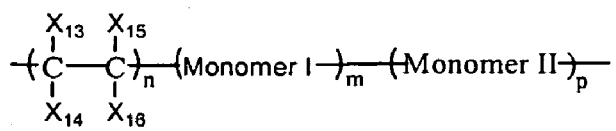
FIG. 4 is a diagram of a halogen-containing co-polymer.
Figure 5:
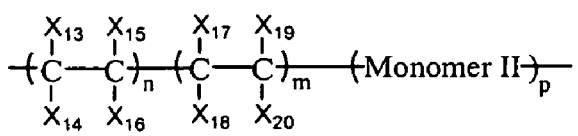
FIG. 5 is a diagram of a halogen-containing co-polymer.

The halogen-containing co-polymers can also have a general structure as shown in FIGS. 4 and 5, in which the halogen content is between 5 and 90 weight percent, more desirably between 30 and 70 weight percent. The co-polymers consist of at least three different monomers in which the monomers with halogen content (X13-X16) are preferred to be the major components (greater than 50 weight percent). Two of the three monomers can be the same as the monomers in the co-polymers shown in FIG. 2 and the other monomer can be varied, based on the desired characteristics of the particles. In the structure of FIG. 5, at least one of X17-X20 is a hydrophilic group as generally discussed above.

The phosphorescent molecules which may be used for encapsulation by the halogen-containing polymers and co-polymers can have various structures. They can be organic compounds, organic/inorganic hybrid materials, and metal chelates with organic ligands. Phosphorescent molecules suitable for encapsulation include, but are not limited to, platinum, palladium, ruthenium, osmium, iridium, indium, molybdenum, technetium, copper, iron, chromium, tungsten, zinc and rhenium which may be complexed with various ligands. Ligands useful in such complexing include porphyrins and their derivatives, porphine and its derivatives, polypyridyl and its derivatives, pyridine, pyrazine, isonicotinamide, imidazole, bipyridine, terpyridine, phenanthroline and dipyridophenazine.

Suitable ligands may be substituted with alkyl, substituted alkyl, aryl, substituted aryl, aralkyl, substituted aralkyl, carboxylate, carboxaldehyde, carboxamide, cyano, amino, hydroxy, imino, hydroxycarbonyl, aminocarbonyl, amidine, guanidinium, ureide, sulfur-containing groups, phosphorus containing groups, and the carboxylate ester of N-hydroxysuccinimide.

Porphyrins and porphine metal complexes possess pyrrole groups coupled together with methylene bridges to form cyclic structures with metal chelating inner cavities. Many of these molecules exhibit strong phosphorescence properties at room temperature in suitable solvents (e.g., water) and an oxygen-free environment. Some suitable porphyrin complexes that are capable of exhibiting phosphorescent properties include, but are not limited to, platinum (II) coproporphyrin-I and II, palladium (II) coproporphyrin, ruthenium coproporphyrin, zinc (II)-coproporphyrin-I, derivatives thereof, and so forth. Similarly, some suitable porphine complexes that are capable of exhibiting phosphorescent properties include, but not limited to, platinum (II) tetra-meso-fluorophenylporphine and palladium (II) tetra-meso-fluorophenylporphine.

As indicated above, bipyridine metal complexes may also be utilized in the present invention. Some examples of suitable bipyridine complexes include, but are note limited to, bis[(4,4'-carbomethoxy)-2,2'-bipyridine]2-[3-(4-methyl-2,2'-bipyridine-4-yl)propyl ]-1,3-dioxolane ruthenium (II); bis(2,2'bipyridine)[4-(butan-1-al)-4'-methyl-2,2'-bi-pyridine]ruthenium (II); bis(2,2'bipyridine)[4-(4'methyl-2,2'bi-pyridine-4'yl)-butyric acid]ruthenium (II); tris(2,2'bipyridine)ruthenium (II); (2,2'-bipyridine) [bis-bis(1,2-diphenylphosphino)ethylene]2-[3-(4-methyl-2,2'-bipyridine-4'-yl)propyl]-1,3-dioxolane osmium (II); bis(2,2'-bipyridine)[4-(4'-methyl-2,2'-bipyridine)-butylamine] ruthenium (II); bis(2,2'-bipyridine)[1-bromo-4(4'-methyl-2,2'-bipyridine-4-yl)butane]ruthenium (II); bis(2,2'-bipyridine)maleimidohexanoic acid, 4-methyl-2,2'-bipyridine-4'-butylamide ruthenium (II), and so forth.

The dissolving solvents should have very good solubility for both the encapsulating polymer/copolymers and the phosphorescent molecules. The dissolving solvents can be a single chemical species or mixtures of several chemicals. Examples of the dissolving solvents include, but are not limited to, dimethylformamide (DMF), dimethylsulfoxide (DMSO), tetrahydrofurane (THF), methanol, ethanol, propanol, pentane, pentene, hexane, methyl ethyl ketone, acetone, acetonitrile, methylene chloride, cyclohexane, chloroform, and mixtures thereof.

The precipitating solvents should have poor solubility for both polymers/copolymers and phosphorescent molecules and may be polar or non-polar. The precipitating solvents can also be one chemical species or mixtures of several chemicals. The precipitating solvents may be chosen from the same listing as the dissolving solvent though of course they may not be the same chemical in any particular instance. E.g., if water were used as the dissolving solvent it cannot be used as the precipitating solvent.

Selection of the dissolving solvents and precipitating solvents depends not only upon the characteristics of HCPs and phosphorescent molecules, but also surface properties and sizes of the particles desired. The dissolving solvents may or may not be completely miscible with each other.

In order to demonstrate the present invention, platinum and palladium tetramethyl pentafluorophenyl porphine (Pt-TMFPP and Pd-TMFPP from Frontier Scientific Inc., Logan, Utah, USA) were chosen as phosphorescent compounds for encapsulation. In the presence of oxygen or air, the two compounds have very weak phosphorescence. In the absence of oxygen, they exhibit very strong phosphorescence at about 650 nm for Pt-TMFPP and about 670 nm for Pd-TMFPP when they are excited at about 390 nm. These two phosphorescent molecules are soluble in many organic solvents such as toluene, benzene, methanol, DMF and DMSO, but are not soluble in water.

Poly(acrylonitrile) (PAN) was selected as a benchmark or control matrix for comparison because, as is known in the art, PAN is a good matrix for encapsulation of phosphorescent molecules and also because PAN and its derivatives are commercially used for production of phosphorescent particles. PVF and PVC were selected as examples of simple HCPs for encapsulation of Pt-TMFPP and Pd-TMFPP.

The inventors have found that PVF and PVC can provide higher practical loading of Pt-TMFPP and Pd-TMFPP than PAN. The phosphorescence intensity continues to increase when the loading of Pt-TMFPP in PVF and PVC increases to about 3 percent Pt-TMFPP. In contrast, however, the phosphorescence intensity starts to level off (at much lower phosphorescence intensity) at about 1 percent Pt-TMFPP loading when PAN is used as an encapsulating matrix for the same phosphorescent molecule under the same conditions. Similar results were observed for Pd-TMFPP. The HCP encapsulated phosphorescent particles also have several times greater phosphorescence intensity than PAN encapsulated phosphorescent particles with the same loading of the phosphorescent molecules. The detailed results are described below.

Our results also show that the halogen-containing polymer or copolymer matrices can have very low oxygen content and so protect the phosphorescence from oxygen quenching. Polyacryonitrile and derivatives are well known to have low oxygen solubility and permeability and have been used to encapsulate phosphorescent molecules to produce phosphorescent particles. Lifetime measurements for Pt- and Pd-TMFPP encapsulated in PAN and PVF and PVC found that the phosphorescence lifetimes are almost identical in the three matrices, suggesting that they all have very low oxygen quenching. The maximal phosphorescence intensity of the particles encapsulated by PVF and PVC can be much higher than that of PAN, however.

Phosphorescent particles with surface functional groups can be produced by the present invention by using halogen-containing co-polymers. Surface functional groups provide the particles with the ability to interact with other materials by making them chemically reactive, for example, by being hydrophilic, hydrophobic, acidic, basic, etc. The co-polymers have at least two different monomers, one which has halogen atom(s) and is hydrophobic, such as vinylchloride, and the other which has hydrophilic groups such as methacrylate acid, acrylic acid, ethanolamine, polyethylene glycol (PEG), pyridine side chains, ammonium side chains or others. In order for some of the hydrophilic monomers to stay at the particle surfaces, water or water mixing solvents are desirable as the precipitating solvent. In such a case, the hydrophobic portion containing halogen atoms forms the particle core along with the encapsulated hydrophobic phosphorescent molecules, and a portion of the hydrophilic groups sit at the interface where the hydrophobic core phase and hydrophilic phase are separated. Examples of the copolymers useful for producing surface functionalized phosphorescent particles include, but are not limited to, copolymers of poly(vinyl chloride) with acrylic acid, maleic acid, vinyl pyridinium, monomers with amino and imine groups, and monomers with sulfonate groups.

Figure 6:
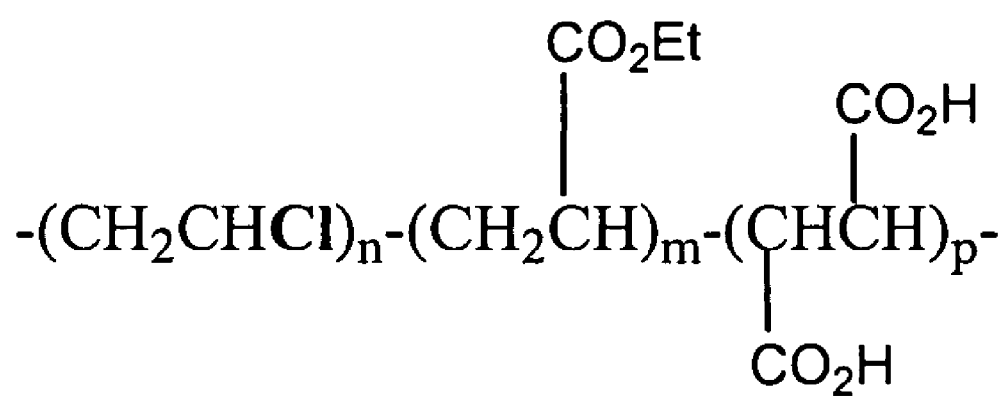
FIG. 6 is a diagram of poly(vinyl chloride-co-vinyl acetate-co-maleic acid) (PVCEM).

One type of halogen-containing co-polymer useful for encapsulation of phosphorescent molecules may be expressed, for example, as poly(vinyl chloride)-(monomer I)-(monomer II) and is illustrated in FIGS. 4 and 5. It is believed that the vinyl chloride portion provides good compatibility and high solubility for hydrophobic molecules such as Pd-TMFPP and Pt-TMFPP. The monomer I portion is desirably hydrophilic to provide surface functional groups, and the monomer II portion can be used for other purposes such as cross-linking. One specific example of such a copolymer is poly(vinyl chloride-co-vinyl acetate-co-maleic acid) (PVCEM) to provide phosphorescent particles with carboxylic acid on the surface. The PVCEM (FIG. 6) that was used in some Examples contained 86% vinyl chloride, 13% vinyl acetate and 1% maleic acid. The maleic acid can provide surface functional groups and water-compatibility and vinyl acetate can be used for cross-linking. PVCEM was found to provide an excellent matrix for high loading of Pt-MTFPP and act as a shield from oxygen, which results in very high phosphorescence intensity of the particles. To make the surface functionalized particles, the polymers and the phosphorescent molecules such as Pt-TMFPP and Pd-TMFPP are dissolved in a water-miscible solvent such as DMF or THF. Depending on the particle size desired, the solution may be added to water under stirring or alternatively, water can be added to the solution to co-precipitate the polymers and phosphorescent molecules. The particles formed can be further processed or analyzed.

The particle sizes can be readily tailored by various techniques. One of the parameters used to control the particle sizes is the choice of solvent. By using different dissolving solvents, the particles of different sizes can be obtained. For example, small particles are obtained when DMF or DMSO are used as dissolving solvents, while larger particles are obtained with THF. Another parameter used to control size is addition speed of the polymer/dye solution to water. Increasing addition speed results in smaller particles for PVCEM/Pt- or Pd-TMFPP systems. The desirable particle size is between 10 nm and 10 microns, more desirably between 50 nm and 1 micron and still more desirably between 150 and 500 nm.

The particles of PVCEM/Pt-TMFPP were found to be quite monodispersed by both light scattering techniques as indicated by polydispersity, and scanning electron microscope (SEM). Polydispersity between about 0.005 and 0.5 are achievable. The particles were mechanically stable under normal aqueous environments and can tolerate both bath-sonication and probe-sonication. Heating of the particles under 50° C. for a half hour does not affect the particle sizes or phosphorescent properties upon cooling. The phosphorescent particles are also found to be extremely stable photochemically; irradiation by UV for one hour causes very little phosphorescence degradation.

The mechanical stability and hydrophilic surfaces of the particles are indicated by several characteristics of the particles; the particles can be easily precipitated and are re-suspended in water for many cycles without size change. In addition, the surface functional groups have been confirmed by co-valently attaching antibodies to the particles using carbodiimide as a coupling reagent.

The antibody-coated phosphorescent particles have been used to detect c-reactive protein (CRP) using time-resolved phosphorescence measurements on lateral flow devices. The detection sensitivity achieved by the particles is very high.

Comparison of the phosphorescence intensity with two commercial phosphorescent particles indicates that the particles of PVCEM/Pt-TMFPP have the highest phosphorescent intensity with the same weight of particles The invention may be better understood through the following examples, where it should be noted that polyacrylonitrile (PAN) is a comparative material and not an embodiment of the invention. All water used in the Examples was filtered and de-ionized.

EXAMPLE 1

Encapsulation and Phosphorescence of Pt-TMFPP in PVF, PVC and PAN:

Four sample vials were prepared. Each of the first three vials contained 30 µg of Pt-TMFPP, 600 µl DMF and 3 mg of each polymer. The polymer in each vial was different. Vial 1 contained PVF (MW: 150000, from Aldrich Chemical Co., Milwaukee, Wis.), vial 2 contained PVC (MW: 110000 from Aldrich) and vial 3 contained PAN (MW: 120,000, from Polysciences Inc., Warrington, Pa.). The fourth vial contained 30 µg of Pt-TMFPP (from Frontier Scientific) and 600 µl DMF without polymer. The samples were heated at 50° C. until all solids were dissolved. After being allowed to cool, 3 ml of water was added drop-wise to each vial, with stirring. After stirring for about 10 minutes, 40 µl of each sample was diluted into 400 µl of water for phosphorescence measurements.

Time-resolved phosphorescence measurements were carried out using a Fluorolog III Spectrofluorimeter (from JoBin Yvon Horiba, Edison, N.J.) with phosphorescence measurement capability. The same detection cell at ambient conditions was used for all four samples. The parameters used in the measurements were also the same for all four samples; excitation light at 390 nm, phosphorescence at 650 nm, number of scans was 1, initial delay was 0.02 ms, the sample window was 2 ms, the time per flash was 50 ms and the number of flashes was 20. The results are given in units of thousand photon counts (k). The phosphorescence intensities were 32.3 k, 15.7 k, 8.98 k and 1.52 k, respectively, for Pt-TMFPP in PVF, PVC, PAN and water (without polymer). The decay profiles of PVF and PAN particles are almost identical, indicating they have similar oxygen concentration if any.

It is clear from this example that PVF and PVC provided greater phosphorescence intensity than PAN or the absence of a polymeric matrix and comparable oxygen barrier properties.

EXAMPLE 2

Encapsulation and Phosphorescence of Pd-TMFPP in PVF, PVC and PAN:

The procedure used to make the particles is the same as that used in Example 1 except using Pd-TMFPP (Frontier Scientific) instead of Pt-TMFPP. The time-resolved phosphorescence measurements for the particles are the same as well. The phosphorescence intensity for PVF, PVC, PAN and without polymer is 552 K, 214 K, 106 K and 5.2 K, respectively.

EXAMPLE 3

Loading and Phosphorescence Comparison of Pt-TMFPP in PVF and PAN:

Eight samples vials were prepared. The first four vials contained 600 µl PVF (5 mg/ml) in DMF and varying amounts of Pt-TMFPP in DMF (4 mg/ml). The amounts of Pt-TMFPP were 25, 12.5, 6.25 and 3.75 µl in the various vials. The loading of the Pt-TMFPP in PVF was 0.5%, 0.83%, 1.67% AND 3.3% for the four samples, respectively. An amount of DMF was added to the vials to bring the total volume per vial to 625 µl and then 3 ml of water was added to each vial drop-wise with stirring. The second four vials were prepared in an identical manner to the first four vials using PAN (5 mg/ml) instead of PVF as the encapsulating material. 20 µl of each sample was diluted into 480 µl of water for phosphorescence measurements. Time-resolved phosphorescence measurements were carried out using a Fluorolog III Spectrofluorimeter using the same procedure as in Example 1. The same cell at ambient conditions was used for all eight samples. The parameters used in the measurements were also the same for all eight samples; excitation light at 390 nm, phosphorescence at 650 nm, number of scans was 1, initial delay was 0.02 ms, the sample window was 2 ms, the time per flash was 50 ms and the number of flashes was 20. The phosphorescence intensities were 22.9 k, 20.9 k, 13.9 k, 9.59 k, 4.86 k, 4.72 k, 5.29 k, and 2.61 respectively for the eight vials.

It is clear from this example that PVF is far superior to PAN as an encapsulation matrix material for Pt-TMFPP in terms of phosphorescence intensity and loading. The phosphorescence intensity reaches a maximum with a loading of about 1 weight percent for PAN, while the phosphorescence intensity continues to increase with a loading up to 3 weight percent for PVF.

EXAMPLE 4

Loading and Phosphorescence Comparison of Pd-TMFPP in PVF and PAN:

The procedures used to make the particles are the same as that used in Example 3 except using Pd-TMFPP to replace Pt-TMFPP and 10 samples were prepared. The time-resolved phosphorescence measurements for the particles are the same as well. The phosphorescence intensity for PVF particles with Pd-TMFPP loading of 0.5%, 0.83%, 1.67%, 3.3% and 6.7% for the five samples was 279 K, 331 K, 806 K 638 K and 637 K, respectively. The phosphorescence intensity for PAN particles with Pd-TMFPP loading of 0.5%, 0.83%, 1.67%, 3.3% and 6.7% for the five samples was 198 K, 283 K, 52 K, 28 K and 39 K, respectively.

It is clear from this example that PVF is far superior to PAN as an encapsulation matrix material for Pd-TMFPP in terms of phosphorescence intensity and loading. The phosphorescence intensity reaches maximal with a loading of about 1 weight percent for PAN, while the phosphorescence intensity continues to increase with a loading up to about 2 weight percent for PVF.

EXAMPLE 5

Encapsulation and Phosphorescence of Pt-TMFPP in PVCEM Using DMF as Dissolving Solvent:

To each of four vials (labeled as Sample 1, 2, 3, and 4) containing 600 μl PVCEM (5 mg/ml in DMF) and a different amount of Pt-TMFPP in DMF (4 mg/ml), ranging from 25 μl, 12.5 μl, 6.25 μl and 3.75 μl, respectively, was added drop-wise 3 ml water with stirring. To another vial (Sample 5) containing 600 μl PAN in DMF and 6.25 μl Pt-TMFPP in DMF (4 mg/ml), was also added 3 ml water with stirring. After addition of water, the solutions were stirred for another five minutes. 10 μl of each sample was diluted with 490 μl water for phosphorescence measurement. The phosphorescence intensity at 650 nm (excited at 390 nm) was found to be 690 K, 387 K, 174 K, 160 K and 41 K for sample 1, 2, 3, 4 and 5, respectively.

This example shows that the phosphorescence intensity of Pt-TMFPP in PVCEM is higher than the phosphorescence intensity in PAN with a comparable dye loading.

EXAMPLE 6

Encapsulation and Phosphorescence of Pt-TMFPP in PVCEM Using THF as Dissolving Solvent:

To each of four vials (labeled as Sample 1, 2, 3, and 4) containing 600 μl PVCEM (5 mg/ml in THF) and a different amount of Pt-TMFPP in DMF (4 mg/ml), ranging from 25 μl, 12.5 μl, 6.25 μl and 3.75 μl, respectively, was added drop-wise 3 ml water with stirring. To another vial (Sample 5) containing 600 μl PAN in DMF and 6.25 μl Pt-TMFPP in DMF (4 mg/ml), was also added 3 ml water with stirring. After addition of water, the solutions were stirred for another five minutes. 10 μl of each sample was diluted with 490 μl water for phosphorescence measurement. The phosphorescence intensity at 650 nm (excited at 390 nm) was found to be 586 K, 320 K, 176 K, 118 K and 23 K for sample 1, 2, 3, 4 and 5, respectively.

This example shows that the phosphorescence intensity of Pt-TMFPP in PVCEM is higher than the phosphorescence intensity in PAN with a comparable dye loading.

EXAMPLE 7

Particle Analysis for PVCEM/Pt-TMFPP Particles in DMF:

10 μl of sample 2 and 4 of Example 5 were diluted in 3 ml of 1 millimole KCl and analyzed for particle size by Zeta Potential Analyzer (Brookhaven Instruments, Co., Holtsville, N.Y.). For the measurements, 2.20 was used for refractive index of particles and 90° angle was used. The measurement results indicate that the average sizes are 67.8 nm (polydispersity, PD: 0.005) and 70.7 nm (PD: 0.005) for sample 2 and 4, respectively. For re-suspensibility testing, the particles of sample 2 were first precipitated by centrifuging (15 mins, 14 K rmp) and the supernatant was taken out.

The particles were found to be readily re-suspended in water by bath-sonication. The size analysis indicated the average size of 79.9 nm (PD: 0.504) for the re-suspended particles, suggesting the particle size did not change significantly, thus indicating good mechanical stability.

EXAMPLE 8

Particle Analysis for PVCEM/Pt-TMFPP Particles in THF:

10 μl of the samples of Example 6 were diluted in 3 ml of 1 mM KCl and analyzed for size in the same manner as in Example 7. The measurements indicate the average sizes of 234 nm (polydispersity, PD: 0.032), 140 nm (PD: 0.102), 158 nm (PD: 0.062) and 163 nm (PD: 0.034) for samples 1, 2, 3 and 4, respectively. For re-suspensibility testing, the particles of samples 1 and 3 were first precipitated by centrifuging (15 mins, 14 K rmp) and the supernatant was taken out. The particles were found to be readily re-suspended in water by 10 minutes of bath sonication. The size analysis indicated the average size of 225 nm (PD: 0.021) and 163 nm (PD: 0.054) for the re-suspended particles of samples 1 and 3, suggesting the particle size did not change. The re-suspended particles of sample 3 were further probe-sonicated for 20 seconds and the size analysis indicated that the particles size remained the same (163 nm with PD: 0.034).

EXAMPLE 9

Figure 7:
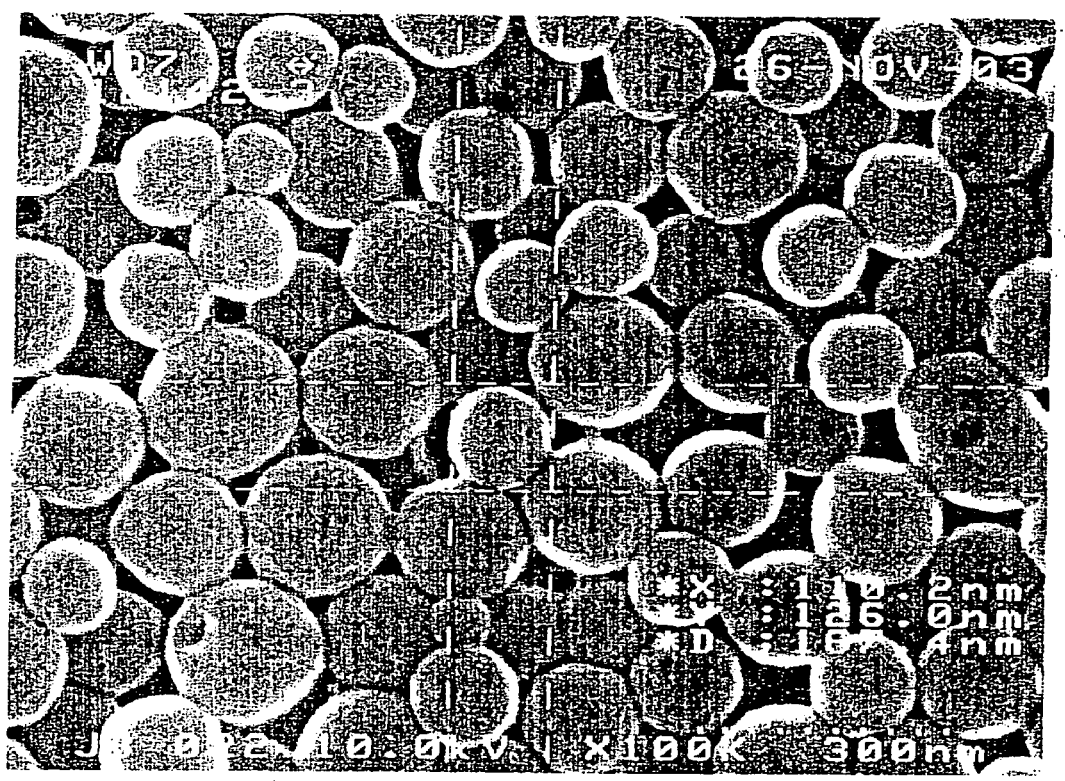
FIG. 7 is an SEM image of PVCEM/Pt-TMFPP particles.

Particle Analysis for PVCEM/Pt-TMFPP Particles Made in THF by Scanning Electron Microscopy:

The PVCEM/Pt-TMFPP particles (PVCEM/Pt-TMFPP=60) prepared in THF were washed by water and then re-suspended in water. Light scattering techniques using Zeta Potential Analyzer suggested a particle size of 140 nm. The same particles were further analyzed by SEM and the SEM image of the particles is shown in FIG. 7. In FIG. 7, the scale is 3.2 cm is equal to 300 nm. The SEM results are consistent with the results obtained from Zeta Potential Analyzer.

EXAMPLE 10

Photo Stability Comparison of PVCEM/Pt-TMFPP Particles

5 µl (1 mg/ml) of PVCEM/Pt-TMFPP particles (PVCEM/Pt-TMFPP=120, size=167 nm, precipitated from THF) was washed once by water and re-suspended in 495 µl water. The particles were continuously irradiated with 390 nm light and its phosphorescence monitored at 650 nm by a Fluorolog III fluorimeter. There was a diminution in phosphorescence of less than 2 percent after 10 minutes of irradiation. When the particles were immobilized on nitrocellulose membranes commonly used in lateral flow devices, continuous irradiation by 390 nm light for 10 minutes caused no degradation of phosphorescence. This example indicates that the phosphorescence particles are very stable photo-chemically.

EXAMPLE 11

Covalent Conjugation of Antibody to PVCEM/Pt-TMFPP Particles:

6 ml of PVCEM/PtTMFPP particles (PVCEM/PtTMFPP=120, 1 mg/1.2 ml) in water/THF (3/0.6) was washed once by water, then by phosphate buffered saline (PBS) (from Polysciences, Inc) through centrifuging. The washed particles were suspended in 500 µl PBS by bath-sonication (10 mins) followed by 10 seconds of probe-sonication. To the particle suspension was added 3 mg carbodiimide in 50 µl PBS and the mixture was shaken for 15 mins. The particles were then washed twice by borate buffer through centrifuging and the washed particles were suspended in 400 µl borate buffer.

To the particle suspension was added with 35 µl CRP monoclonal antibody (6.4 mg/ml, CRP Mab1 from Biodesign, catalog number A5811)) and the mixture was shaken overnight. To the mixture was then added with 200 µl ethanolamine (Polysciences, Inc.) and 50 µl bovine serum albumin (BSA) (1 mg/ml) and the mixture was shaken for half hour. Then the particles were washed twice by hepes buffer (N-[2-hydroxyethyl]piperazine-N'-(2-ethanesulfonic acid) from Sigma-Aldrich Chemical Co., Inc. of St. Louis, Mo., pH: 7.4). The washed particles were suspended in 1000 µl hepes containing 0.02 mg/ml BSA by 10 mins of bath-sonication, followed by 10 seconds probe-sonication. The suspended particles were stored at 4° C. and used for testing in Example 12.

EXAMPLE 12

Detection of CRP Using Conjugates:

60 µl of conjugates prepared in example 10 was diluted with 280 µl hepes and 280 µl of Tween 20 (2% from Alrich) to prepare a conjugate suspension. To each of the eleven wells on a microtiter plate was added 40 µl of the conjugate suspension. CRP (from Biodesign Inc.) was diluted in tris-buffered saline (TBS) in the amounts indicated below. The wells were labeled as well 1, 2, 3, 4, 5, 6, 7, 8, 9, 10 and 11, respectively. To well 1, 2, 3, 4, 5, 6, 7, 8, 9, 10 and 11 was added 10 µl hepes, 7.5 µl hepes and 2.5 µl CRP (10 ng/ml), 5 µl hepes and 5 µl CRP (10 ng/ml), 10 µl CRP (10 ng/ml), 7.5 µl hepes/and 2.5 µl CRP (100 ng/ml), 5 µl hepes and 5 µl CRP (10 ng/ml), 10 µl CRP (100 ng/ml), 7.5 µl hepes and 2.5 µl CRP (1 ug/ml), 5 µl hepes and 5 µl CRP (1 ug/ml), 10 µl CRP (1 ug/ml), and 7.5 µl hepes and 2.5 µl CRP (10 ug/ml), respectively. To each of the wells was inserted a half lateral flow device ("dipstick") striped with 1 mg/ml CRP Mab2 for detection line (CRP Mab2: CRP monoclonal antibody, catalog number A5804, from Biodesign) and striped with a polylysine solution (10 mg/ml) as a control line.

The method for preparation of the half lateral flow devices was as follows: A nitrocellulose porous membrane (HF 120 from Millipore, Inc.) having a length of approximately 30 centimeters was laminated onto supporting cards. Gold-line™ polylysine solution (from British Biocell International) was stripped onto the membrane to form a calibration line. In addition, monoclonal antibody for C-reactive protein (Mab2) (catalog number 5804, available from Biodesign, concentration of 1 milligram per milliliter) was immobilized on the porous membrane to form a detection line. The membrane samples were then dried for 1 hour at a temperature of 37° C. A cellulosic fiber wicking pad (Millipore, Inc. Co.) was attached to one end of the membrane and cut into 4-millimeter half strips.

The dipsticks were allowed to develop for half hour. The phosphorescence at 650 nm on the detection line of each device was then measured with a Fluorolog III Spectrofluorimeter by exciting at 390 nm. The phosphorescence intensity at 650 nm for the device in well 1 to 11 was 4.98, 4.87, 4.89, 6.60, 9.81, 11.2, 18.5, 21.6, 26.9, 27.9 and 22.7 K, respectively.

This example shows that the functionalized phosphorescent particles can be used for quantifying CRP.

As will be appreciated by those skilled in the art, changes and variations to the invention are considered to be within the ability of those skilled in the art. Examples of such changes are contained in the patents identified above, each of which is incorporated herein by reference in its entirety to the extent it is consistent with this specification. Such changes and variations are intended by the inventors to be within the scope of the invention. It is also to be understood that the scope of the present invention is not to be interpreted as limited to the specific embodiments disclosed herein, but only in accordance with the appended claims when read in light of the foregoing disclosure.

What is claimed is:

1. A phosphorescent particle comprising a phosphorescent material encapsulated in a halogen-containing polymer, wherein the size of the particle is from about 10 nanometers to about 10 micrometers.

2. The particle of claim 1 where the phosphorescence can be detected by an unaided human eye.

3. The particle of claim 1 where the halogen-containing polymer that encapsulates the phosphorescent material contains between 5 and 90 weight percent halogen.

4. The particle of claim 1 where the halogen-containing polymer that encapsulates the phosphorescent material contains between 30 and 70 weight percent halogen.

5. The particle of claim 4 wherein said halogen-containing polymer is selected from the group consisting of polyvinyl fluoride, polyvinyl chloride, polyvinyl bromide and mixtures thereof.

6. The particle of claim 1 where the halogen-containing polymer has the general structure:

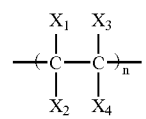

where at least one of $X_1$-$X_4$ contains one or more halogen atoms.

7. The particle of claim 1 where the phosphorescence material is a metal chelate.

8. The particle of claim 7 where the phosphorescent material is selected from the group consisting of bis[(4,4'-carbomethoxy)-2,2'-bipyridine]2-[3- -(4-methyl-2,2'-bipyridine-4-yl)propyl]-1,3-dioxolane ruthenium (II); bis(2,2'bipyridine)[4-(butan-1-al)-4'-methyl-2,2'-bi-pyridine] ruthenium (II); bis(2,2'-bipyridine)[4-(4'-methyl-2,2'-bipyridine-4'-yl)-butyric acid]ruthenium (II); tris(2, 2'bipyridine)ruthenium (II); (2,2'-bipyridine) [bis-bis(1,2-diphenylphosphino)ethylene]2-[3-(4-methyl-2,2'-bipyridine-4'-yl)propyl]-1,3-dioxolane osmium (II); bis(2, 2'-bipyridine)[4-(4'-methyl-2,2'-bipyridine)-butylamine] ruthenium (II); bis(2,2'-bipyridine)[1-bromo-4(4'-methyl-2, 2'-bipyridine-4-yl)butan-e]ruthenium (II); bis(2,2'-bipyridine)maleimidohexanoic acid, 4-methyl-2,2'-bipyridine-4'-butylamide ruthenium(II), platinum (II) tetra-meso-fluorophenylporphine (Pt-TMFPP), and palladium (II) tetra-meso-fluorophenylporphine (Pd-TMFPP).

9. A phosphorescent particle comprising a halogen-containing polymer encapsulating a phosphorescent material, wherein said halogen-containing polymer has at least one surface functional group, wherein the size of the particle is from about 10 nanometers to about 10 micrometers.

10. The particle of claim 9 wherein said surface functional group is a hydrophilic group selected from the group consisting of carboxylic acid groups, ethanolamine groups, hydroxyl groups, amine groups, amino groups, imine group and polyethylene glycol groups.

11. The particle of claim 9 wherein said halogen-containing polymer is poly(vinyl chloride-co-vinyl acetate-co-maleic acid).

12. The particle of claim 1, wherein the size of the particle is from about 50 nanometers to about 1 micrometer.

13. The particle of claim 1, wherein the size of the particle is from about 150 nanometers to about 500 nanometers.

14. The particle of claim 9, wherein the size of the particle is from about 50 nanometers to about 1 micrometer.

15. The particle of claim 9, wherein the size of the particle is from about 150 nanometers to about 500 nanometers.

16. The particle of claim 1, wherein the particle is attached to an antibody.

17. The particle of claim 9, wherein the particle is attached to an antibody.

* * * * *